Feb. 7, 1939.  H. E. TREKELL  2,146,606

WATT-HOUR METER

Filed Dec. 23, 1936

Inventor:
Harold E. Trekell,
by Harry E. Dunham
His Attorney.

Patented Feb. 7, 1939

2,146,606

UNITED STATES PATENT OFFICE 2,146,606

WATT-HOUR METER

Harold E. Trekell, Beach Bluff, Mass., assignor to General Electric Company, a corporation of New York Application December 23, 1936, Serial No. 117,358

6 Claims. (Cl. 171—264)

My invention relates to watt-hour meters and concerns particularly lag plate mounting arrangements for watt-hour meters and other devices of the induction disk type.

It is an object of my invention to provide a lag plate mounting arrangement which permits adjustment of both the lag and light-load torque of a watt-hour meter or a similar device by the use of a single plate serving as the combined lag and light-load plate.

A further object of my invention is to provide an arrangement which permits making either adjustment substantially without affecting the other adjustment.

It is still another object of my invention to provide a mounting arrangement for lag plates serving to compensate for temperature errors of the class varying with power factor.

Other and further objects and advantages will become apparent as the description proceeds.

In accordance with my invention in its preferred form, I utilize a lag coil or plate stamped from sheet metal and slidably mount it in a frame which is pivoted near the axis of rotation of the meter disk so that angular adjustment of the mounting frame serves to vary the lateral position of the lag plate with respect to the current and potential pole pieces for correcting the light-load torque, and radial adjustment of the lag plate within the frame serves to vary the amount of magnet flux intercepted by the lag plate for correcting the amount of lagging provided.

Figure 1:
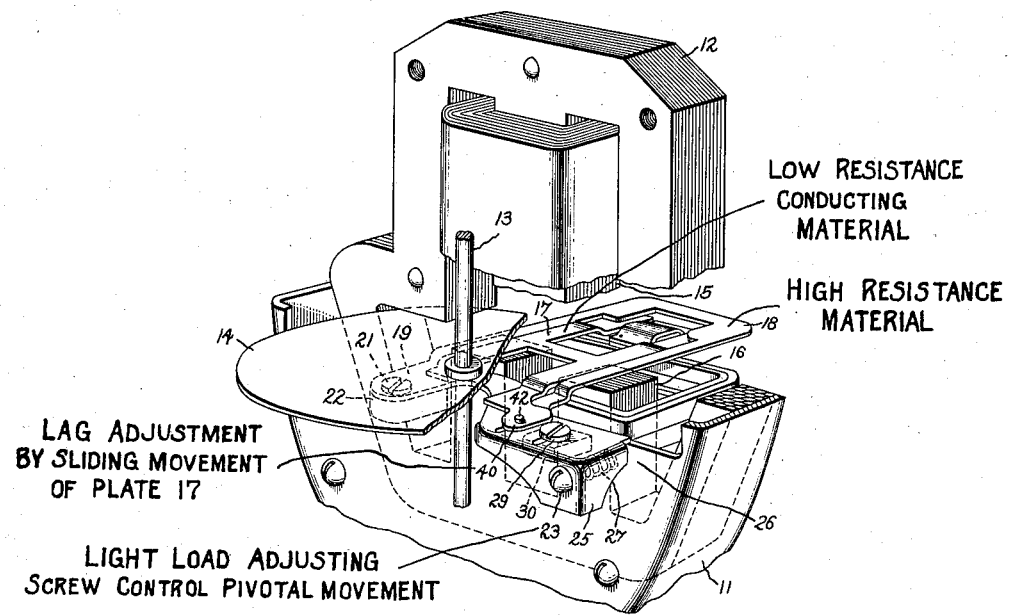
Figure 2:
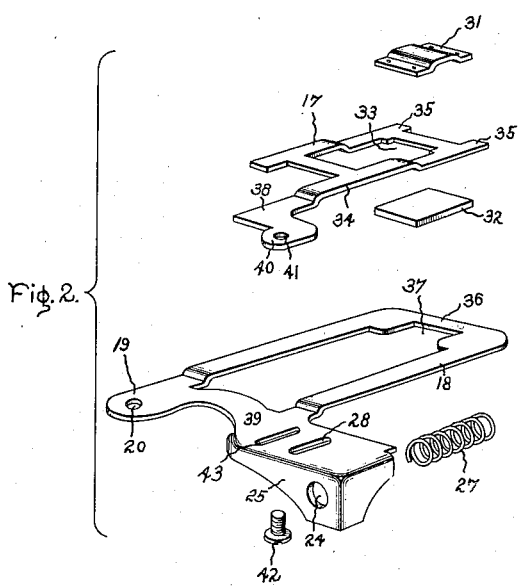

The invention may be understood more readily from the following detailed description when considered in connection with the accompanying drawing and those features of the invention which are believed to be novel and patentable will be pointed out in the claims appended hereto. In the drawing, Fig. 1 is a perspective view of a watt-hour meter mechanism illustrating one embodiment of my invention with certain portions broken away in order to show the parts in the interior of the mechanism; and Fig. 2 is an exploded perspective view of the parts making up the lag plate and the lag plate mounting frame. Like reference characters are utilized throughout the drawing to designate like parts.

Referring now more in detail to the drawing, it will be seen that I have illustrated only the actual meter mechanism omitting the register, casing, cover and other parts, since these do not constitute a part of the present invention. The base to which the parts of the meter mechanism are attached is shown only fragmentarily and may consist of a casting 11 to which is secured a field structure 12 preferably consisting of laminations of magnetizable material and to which are also secured bearings (not shown) for supporting a shaft 13, carrying a meter rotor in the form of an induction disk 14.

The field structure 12 contains an air gap for the induction disk 14. The air gap is formed between the potential magnet 15, the lower end of which is shown broken away for clarity, and a U-shaped current magnet 16. For the purpose of providing the desired lagging between the voltage applied to the meter and the magnetic flux produced by the potential magnet 15 and also for the purpose of providing sufficient light-load torque to overcome the bearing friction of the rotor, a lag plate 17 is provided which is also mounted in the air gap between the potential magnet 15 and the current magnet 16, preferably on the side of the disk 14 toward the current magnet 16. The plate 17 is referred to for convenience as a lag plate but it will be understood that it serves the combined function of a lag plate and a light-load plate. I mean to include such a plate or coil for performing these combined functions wherever I use the term "lag plate" in the description and claims.

For adjustably supporting the leg plate 17, a lag plate mounting frame 18 is provided. The frame 18 may be formed from sheet metal and is provided with an offset ear 19 by means of which the frame 18 is pivotally attached to the casting 11. Any desired means may be employed for pivotally securing the frame 18 to the casting 11, for example, a hole 20 may be punched in the ear 19 and a screw 21 may be provided, which is threaded into a suitable projection 22 on the casting 11 located as close as practicable to the shaft 13 and the axis of rotation of the disk 14.

Angular adjustment of the lag plate mounting frame 18 may be obtained by means of a screw 23 adapted to be inserted in an opening 24 in a transverse projection 25 of the frame 18 and threaded into the base 11 to draw the projection 25 toward the portion 26 of the meter base 11. A spring 27 may be provided for resiliently opposing the action of the screw 23 and rotating frame 18 in the opposite direction about the pivot screw 21 when the screw 23 is backed out. In addition to the screw 21, an elongated slot 28 in the frame 18 and a clamping screw 29 threaded into a projection 30 in the casting 11 may be provided for movably supporting the frame 18.

Although I have disclosed an arrangement in which the variation in light-load torque is obtained by angular adjustment of the mounting frame 18 and the variation in the lagging is obtained by sliding the lag plate 17 within the frame 18, it will be understood that my invention is not limited to this precise arrangement but that I may locate the pivot screw 21 supporting the frame 18 in a suitable position so as to move the lag plate through an arc including the shaft 13 by angular adjustment of the mounting frame 18 for varying the lagging and, in this case, the sliding movement within the frame would serve to vary the light-load torque. If desired, the supporting pivot 21 may also be located on the side of the core 12 away from the shaft 13 whether the arrangement is such that angular adjustment of the mounting frame 18 produces light-load adjustment or lag adjustment.

The lag plate 17 may, if desired, be of the type constructed with a suitable amount of temperature variable reactance integral with the lag plate for the purpose of compensating the meter for temperature errors occurring when the power factor changes. The part of the lag plate providing temperature compensation is not a part of my present invention and this feature may or may not be present without affecting the manner in which lag and light-load adjustment are obtained in my apparatus. Accordingly, the part of the construction providing temperature compensation will be described only briefly. The temperature variable reactance is produced by means of a negative temperature coefficient of permeability magnetic circuit linking the lag plate 17. This circuit may take the form of a piece 31 bent in order to surround partially a portion of the lag plate 17, and a piece 32 secured to the piece 31. One or both of the pieces 31 and 32 are composed of material having a negative temperature coefficient of permeability. I have found that satisfactory results may be obtained by utilizing a 29.5 per cent nickel iron alloy for the piece 32 and a ferromagnetic material known by the trade name "Armco" for the piece 31.

It will be observed that the central portion 33 of the lag plate 17 is cut out to form what may be referred to as a hollow square, which provides a closed electric circuit or loop linking magnetic flux crossing the air gap between the potential magnet 15 and the current magnet 16 of the meter. The width of the plate 17 is such as to cause it to fit within the frame 18, and the portion 34 of the plate 17 may be offset to make the portion 34 of the plate 17 flush with the frame 18 while permitting the ends 35 of the plate 17 to ride under the end 36 of the frame 18. A suitable notch 37 is left in the end portion of the frame 18 to accommodate the reactance forming magnetic pieces 31 and 32. One side of the opposite end 38 of the plate 17 is of such length as to rest upon the end portion 39 of the frame 18, and a perforated ear 40 may be provided at the end 38 on the plate 17 having a threaded hole 41 to receive a clamping screw 42 cooperating with an elongated slot 43 on the frame 18 to permit adjusting the position of the plate 17 in the frame 18 and securing the plate in the desired position. The parts 17 and 18 may be slightly sprung in order to insure that tightening the screw 42 will hold the ends 35 of the plate 17 up against the end 36 of the frame 18.

It will be understood that the lag plate 17 is composed of current-conducting material, such as copper, for example, and that the lag plate mounting frame 18 is preferably composed of material such as an alloy of copper, zinc and nickel, commercially known as 18% nickel silver, for example, having relatively high electrical resistance in order to avoid shunting the reactance of the lag plate 17 and which is substantially nonmagnetic in order to avoid introducing any disturbance in the magnetic field of the field structure 12.

Owing to the fact that the pivot screw 21 of the frame 18 is at some distance from the magnets 15 and 16 and relatively close to the axis of rotation of the disk 14, the frame 18 may be rotated about the screw 21 to make the plate 17 more or less unsymmetrical with respect to the current electromagnet 16, thereby producing a greater or lesser shading effect to obtain the desired adjustment in light-load torque without thereby appreciably affecting the amount of potential flux linked by the plate 17 and thus leaving the lag adjustment substantially unaffected. Likewise, the plate 17 may be slid back and forth within the frame 18 to vary the amount of lagging without any appreciable effect on the shading of the current coils and the light-load torque.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. In combination, a base for supporting the parts of a watt-hour meter, a field structure attached to said base and having an air gap with current and potential magnets for passing magnetic flux across said air gap, an induction disk rotatably mounted to travel through said gap with an axis of rotation at one side of said field structure, a lag plate mounting frame movable in said air gap and having an ear pivotally attached to said base at a point in proximity to the axis of rotation of said disk, a lag plate slidably mounted on said lag plate mounting frame so as to be movable toward and away from the axis of rotation of said disk, mechanism for adjusting the position of said plate in said frame, and means in proximity to said adjusting mechanism for adjusting the angular position of said frame on said base.

2. In combination, a base for supporting the parts of a watt-hour meter, a field structure attached to said base and having an air gap with current and potential magnets for passing magnetic flux across said air gap, an induction disk rotatably mounted to travel through said air gap with an axis of rotation at one side of said field structure, a lag plate mounting frame movable in said air gap and having an ear pivotally attached to said base at a point in proximity to the axis of rotation of said disk, and a lag plate slidably mounted on said mounting frame so as to be movable toward and away from the axis of rotation of said disk and securing means in proximity to each other for adjustably fixing the positions of said frame in said gap and of said plate on said frame.

3. In combination a lag plate mounting frame consisting of sheet metal with the center portion cut away, a lag plate composed of sheet metal with the center portion cut out to form a closed electric circuit and having a width corresponding to the inner width of said frame, said frame having an ear at one end thereof for pivotally mounting said frame, securing means at one end thereof for fixing the angular mounting position of the frame and securing means at the same end for slidably attaching said plate to said frame.

4. In combination, a base for supporting the parts of a watt-hour meter, a field structure attached to said base and having an air gap with current and potential magnets for passing magnetic flux across said air gap, an induction type rotor rotatably mounted to travel through said air gap and having an axis of rotation at one side of said field structure, a lag plate mounting frame movable in said air gap and having an ear pivotally attached to said base, and a lag plate slidably mounted on said lag plate mounting frame so as to be movable toward and away from the pivot point of said frame, the location of the pivot point of said frame being such that pivoting of the frame produces movement of the lag plate in one path and sliding of the plate within the frame produces movement of the lag plate in a path substantially perpendicular to the first path, but in the same plane as said first path, one of said paths being in such a direction as to include the axis of rotation of said rotor if extended thereto and the other of said paths passing through said air gap.

5. A base for supporting in a given position at one side thereof a watt-hour meter field structure for rotating a disc in a horizontal plane around an axis of rotation beside the position of the field structure, said base having a pivot-holding projection in proximity to the disc axis position under the disc plane, and having a clamping-device-holding projection on the side of said base away from the field structure position and under the disc plane, a lag plate mounting frame extending parallel to the disc plane thereunder transversely across the field structure position, having an ear pivotally attached to said pivot-holding projection and having a projection resting on said clamping-device-holding projection, a lag plate mounted slidably within and along said lag plate holding frame, and a clamping device engaging said last mentioned base and frame projections.

6. A base for supporting in a given position at one side thereof a watt-hour meter field structure for rotating a disc in a horizontal plane around an axis of rotation beside the position of the field structure, said base having a pivot-holding horizontal-surfaced projection in proximity to the disc axis position under the disc plane, a lag plate mounting frame extending parallel to the disc plane thereunder transversely across the field structure position, having a flat ear pivotally attached upon said pivot-holding projection, and a lag plate mounted slidably within and along said lag plate holding frame.

HAROLD E. TREKELL.